(12) United States Patent
Stubblefield et al.

(10) Patent No.: US 7,549,170 B2
(45) Date of Patent: Jun. 16, 2009

(54) SYSTEM AND METHOD OF INKBLOT AUTHENTICATION

(75) Inventors: Adam Stubblefield, Baltimore, MD (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 822 days.

(21) Appl. No.: 10/427,452

(22) Filed: Apr. 30, 2003

(65) Prior Publication Data

US 2003/0191947 A1    Oct. 9, 2003

(51) Int. Cl.
H04L 9/32 (2006.01)
G06F 7/04 (2006.01)
(52) U.S. Cl. .......................... 726/27; 713/183; 715/741
(58) Field of Classification Search ................. 380/270; 715/741; 713/183; 726/27
See application file for complete search history.

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,608,387 A | 3/1997 | Davies | |
| 5,778,069 A * | 7/1998 | Thomlinson et al. | 380/262 |
| 6,075,905 A | 6/2000 | Herman et al. | |
| 6,185,316 B1 | 2/2001 | Buffam | |
| 6,209,104 B1 * | 3/2001 | Jalili | 726/18 |
| 6,393,305 B1 * | 5/2002 | Ulvinen et al. | 455/563 |
| 6,516,092 B1 | 2/2003 | Bachelder et al. | |
| 6,720,860 B1 | 4/2004 | Narayanaswami | |
| 6,788,304 B1 * | 9/2004 | Hart et al. | 345/586 |
| 6,868,190 B1 * | 3/2005 | Morton | 382/278 |
| 6,948,068 B2 * | 9/2005 | Lawandy et al. | 713/176 |
| 7,219,368 B2 | 5/2007 | Juels et al. | |
| 7,243,239 B2 | 7/2007 | Kirovski et al. | |
| 7,383,570 B2 | 6/2008 | Pinkas et al. | |
| 2001/0037468 A1 | 11/2001 | Gaddis | |
| 2001/0044906 A1 | 11/2001 | Kanevsky et al. | |
| 2002/0029341 A1 | 3/2002 | Juels et al. | |

OTHER PUBLICATIONS

Dhamija et al., "Deja Vu: A User Study Using Images for Authentication", 2000, SIMS/CS, University of California Berkeley.*

(Continued)

Primary Examiner—Kambiz Zand
Assistant Examiner—William S Powers
(74) Attorney, Agent, or Firm—Lee & Hayes, PLLC

(57) ABSTRACT

A system and method that uses authentication inkblots to help computer system users first select and later recall authentication information from high entropy information spaces. An inkblot authentication module generates authentication inkblots from authentication inkblot seeds. On request, a security authority generates, stores and supplies an authentication inkblot seed set for a user. In response to an authentication inkblot, a user inputs one or more alphanumeric characters. The responses to one or more authentication inkblots serve as authentication information. A user-computable hash of the natural language description of the authentication inkblot is utilized to speed authentication information entry and provide for compatibility with conventional password-based authentication. Authentication with an authentication information match ratio of less than 100% is possible. Authentication inkblot generation methods are disclosed, as well as a detailed inkblot authentication protocol which makes it difficult for users to opt-out of high entropy authentication information generation.

17 Claims, 11 Drawing Sheets

OTHER PUBLICATIONS

Sobrado, "Graphical Passwords", 2002, "The Rutgers Scholar, vol. 4".*

Lipton, "Logical Authentication Methods", Spring 1986, "ACM SIGSAC Review, vol. 4, Iss. 2", pp. 9-20.*

Birget, et al., "Graphical Passwords", pp. 1-8, Rutgers, 2002.

Kenneth, et al., "Fast Computation of Generalized Voronoi Diagrams Using Graphics Hardware", pp. 277-286, ACM, 1999.

Venkatesan et al., "Robust Image Hashing" IEEE 2000, pp. 664-666.

Hoff, "Fast Computation of Generalized Voronoi Diagrams Using Graphics Hardware", ACM, 1999, pp.#227-pp. 286.

Yan, "A Note of Proactive Password Checking", Computer Laboratory, University of Cambridge, ACM, 2002, pp.#664-pp. #666.

* cited by examiner

SYSTEM AND METHOD OF INKBLOT AUTHENTICATION

FIELD OF THE INVENTION

This invention pertains generally to computer systems, and, more particularly, to computer system user authentication.

BACKGROUND OF THE INVENTION

Computer system user authentication, that is, providing evidence of a user's identity to a computer system and then verification of that evidence by the computer system, has become a familiar task for millions of computer system users. User authentication is a cornerstone of computer system security. The ability for a computer system to authenticate user identity enables the enforcement of computer system security policies from simple yes/no data access to sophisticated resource privilege management.

It is common to classify user authentication into three main types based on how the user provides evidence of their identity to the computer system. In knowledge-based user authentication, the user provides information to the computer system that the user has previously memorized, such as a password. In token-based user authentication, the possession of a particular object, such as a key card incorporating computer-readable media, provides the evidence. In biometric user authentication, the user's biological characteristics, such as the user's fingerprints, are detected by the computer system and compared to the characteristics on record. In addition, combinations of these authentication types are possible, for example, an automated teller machine (ATM) requires a user to provide both a token (an ATM card) and memorized information (a personal identification number or PIN) before it will dispense cash.

Knowledge-based user authentication is popular, at least in part because it is relatively inexpensive and convenient. A user theoretically always has their authentication credentials with them and typically no specialized computer system equipment, such as a card reader or biometric detector, is required to input the authentication information. However, there is a conflict at the heart of conventional knowledge-based user authentication that undermines its effectiveness in practice: authentication information that provides the best evidence of a user's identity, i.e., authentication information in an information space with high entropy, is often difficult to remember.

In the context of knowledge-based user authentication, an information space with high entropy is an information space that contains a relatively high number of possible authentication values, and an information space with low entropy contains a relatively low number of possible values. The entropy of an information space is conveniently measured in bits. For example, if the authentication information to be provided by the user is the result of a previous coin toss, the associated information space contains only 'heads' and 'tails'. In this case the information space has an entropy of 1 bit. If the authentication information to be provided by the user is the result of a previous dice throw (ideally known only to the user and the computer system), the information space contains six values and so has an entropy of approximately 2.6 bits ($\log_2(6) \approx 2.6$). If the authentication information to be provided by the user is a word randomly selected from a dictionary of one hundred thousand words, the information space (the dictionary) has an entropy of approximately 17 bits ($\log_2(100000) \approx 17$).

The result of a single coin toss is relatively easy to remember, but it is relatively poor evidence of a computer system user's identity. If the result of a single coin toss is the information that a user must know in order to authenticate, an attacker (someone who is not the user but who is attempting to authenticate as the user) has a 50% chance of authenticating as the user on the first attempt and a 100% chance given two attempts. Knowing a random selection from a one hundred thousand word dictionary provides better evidence of a computer system user's identity. The probability is much lower that an attacker will simply guess the word in the first few attempts. Even given the dictionary and ten attempts, the probability of authenticating as the user is only 1 in 10,000 if the attacker is guessing randomly. However, an attacker with the dictionary and one hundred thousand attempts to guess the word still has a 100% chance of authenticating as that computer system user. There are circumstances in which one hundred thousand guess attempts are well within the capabilities of an attacker equipped with a modern computer system, so that while the dictionary has higher entropy than the single coin toss, its entropy is still insufficient in those circumstances. In addition, even where measures are taken to limit the number of possible guess attempts, a group of users may still be vulnerable, for example, to a "horizontal attack." That is, if each of the fifty thousand users of an organization select a password from a one hundred thousand word dictionary, then an attacker with just two random guesses for each user still has a better-than-even chance of guessing the password of at least one of the organization's users.

A way to make guessing, dictionary and like attacks unprofitable in the context of knowledge-based user authentication is to ensure that the authentication information for each user is selected from a high entropy information space. For example, in the case of the common alphanumeric password, a naïve analysis is as follows: if a 6 character alphanumeric password with 40 bits of entropy ($\log_2(96^6) \approx 40$; assuming 96 alphanumeric characters on a standard English language keyboard) is insufficient, then require of the user an 8 character alphanumeric password with 53 bits of entropy ($\log_2(96^8) \approx 53$). If that is still insufficient, simply require a 10 character alphanumeric password with 66 bits of entropy ($\log_2(96^{10}) \approx 66$), and so on.

A problem in practice is that a random 8 character alphanumeric password typically looks something like: bX#zOk%h. That is, it looks random (without pattern). If a user is permitted to choose their own password, it is uncommon for their choice to be random, at least in part because random passwords are typically hard to remember. A more common choice is one or more natural language (e.g., English language) words and simple (i.e., low entropy) variations thereon. Even if the user has a vocabulary of one hundred thousand words, the entropy of the password is much reduced compared to the random case and the simple "more characters gives more entropy" analysis does not apply. If a user is not permitted to choose their own password, it is common for the user to write down the password, thus undermining knowledge-based authentication in another, and potentially even more damaging, way. In short, human memory quickly becomes the limiting factor in knowledge-based user authentication.

For at least some people, remembering images is easier than remembering text. Conventional knowledge-based user authentication centered around images is conveniently grouped into two categories: recall-based and recognition-based. In image recall-based user authentication, a user in some way recreates an image that they previously created. In image recognition-based user authentication, a user selects an image or sub-image that they previously selected.

Conventional knowledge-based user authentication centered around images has drawbacks. Image recall-based user authentication typically requires precise recall of images, which is not necessarily an improvement over precise recall of text. Image recognition-based user authentication typically takes a relatively long time compared to entering a text password, especially if it seeks to achieve parity in terms of authentication information entropy by requiring a high number of image recognitions. Each image recognition typically contributes at most a single bit of authentication information entropy, e.g., "recognize" or "don't-recognize" an image in a set of images. Conventional knowledge-based user authentication centered around images also typically employs a graphical input mechanism via a graphical output device, resulting in authentication information being exposed on an output device and thus an additional avenue of compromise by an attacker. In addition, conventional knowledge-based user authentication centered around images is typically incompatible with existing text-based user authentication.

There is a need in the art for a system and method of knowledge-based user authentication that helps users select and remember authentication information from high entropy information spaces. Where the system and method employs images as memory aids, it should do so, where possible, without the drawbacks associated with conventional knowledge-based user authentication centered around images. Ideally, such a system and method would compliment and enhance conventional text password-based user authentication rather than replacing it, so as to retain, where possible, the benefits of conventional text password-based user authentication that have made it so popular.

BRIEF SUMMARY OF THE INVENTION

The invention provides a system and method that address shortcomings of the prior art described herein above. These and other advantages of the invention, as well as additional inventive features, will be apparent from the description of the invention provided herein with reference to an exemplary embodiment.

The invention provides a system and method for knowledge-based computer system user authentication. More particularly, the invention is directed to a system and method for the utilization of authentication inkblots to help computer system users first select and later recall authentication information from high entropy information spaces. The invention has a particular relevance to computer systems that currently utilize conventional password-based user authentication, although the invention is not so limited.

An inkblot authentication module is configured to generate authentication inkblots from authentication inkblot seeds. The authentication inkblots are displayed on a graphical output device, and, in response to the authentication inkblot, a user inputs one or more alphanumeric characters. The responses to one or more authentication inkblots serve as authentication information.

An authentication inkblot is generated from an authentication inkblot seed by initializing a pseudo-random number generator with the authentication inkblot seed and then determining the authentication inkblot parameter values as a function of one or more values generated by the pseudo-random number generator. Examples of suitable authentication inkblot parameters are herein disclosed.

There are at least two main inkblot authentication protocol operations: establish/change authentication information, and authenticate. To establish or change authentication information, a series of authentication inkblots is first shown in a random order and then again in the order that is later utilized for authentication, and it is verified that the user's response to a particular authentication inkblot is the same regardless of the order in which it is shown. During authentication, the series of authentication inkblots is presented to help the user recall the authentication information previously established.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
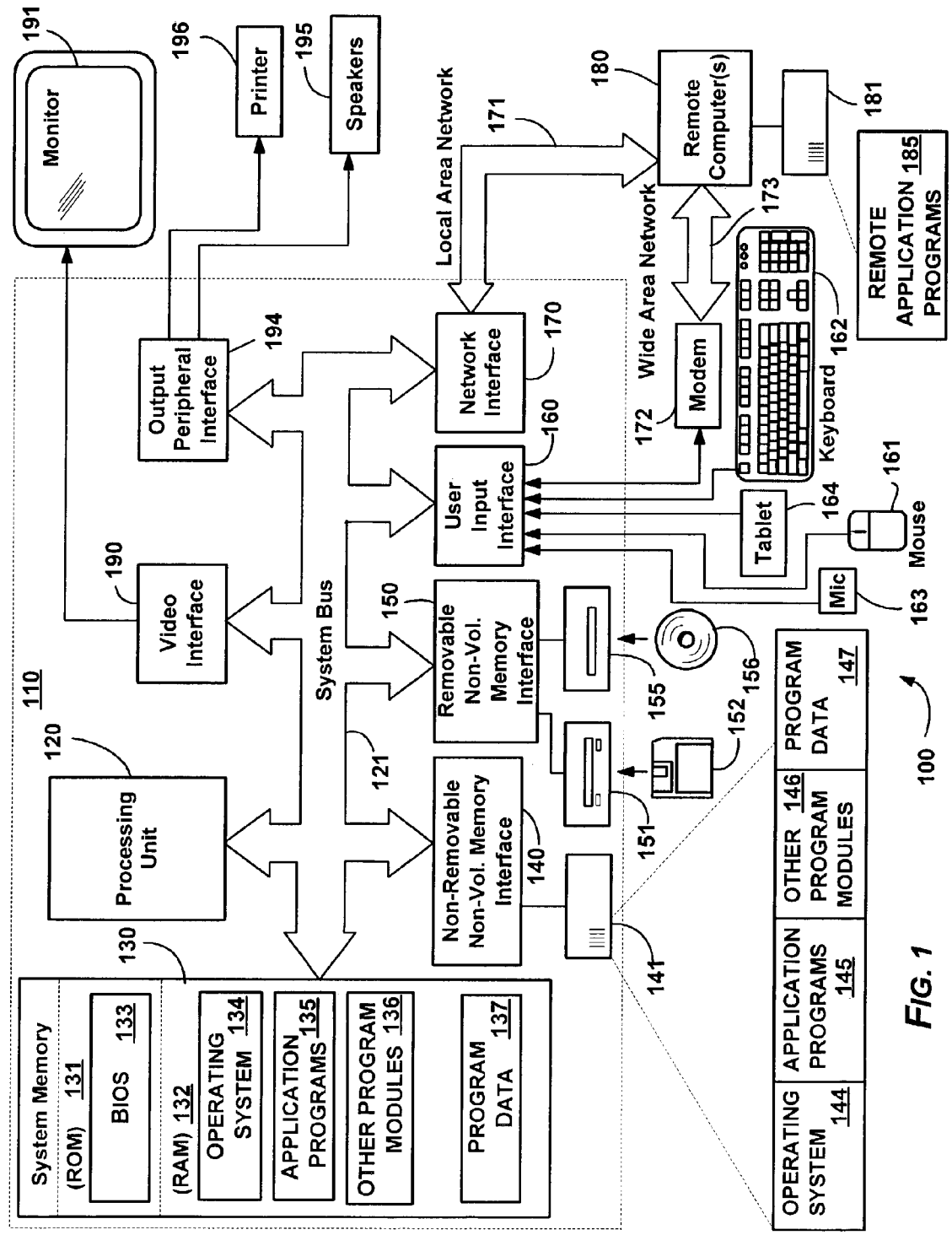
FIG. 1 is a schematic diagram generally illustrating an exemplary computer system suitable for implementing an embodiment of the invention.

The invention is embodied in a computer system that utilizes authentication inkblots to help computer system users first select and later recall authentication information from high entropy information spaces. An inkblot authentication module is configured to generate authentication inkblots from authentication inkblot seeds. On request, a (local or remote) security authority generates, stores and supplies an authentication inkblot seed set for a user. The authentication inkblots are displayed on a graphical output device, and, in response to the authentication inkblot, a user inputs one or more alphanumeric characters. The responses to one or more authentication inkblots serve as authentication information. In general, a longer series of authentication inkblots presented during authentication results in authentication information from a higher entropy information space. It is possible to utilize authentication information thus generated in place of a conventional password, although there are usability advantages to allowing an authentication information match ratio of less than 100%.

An authentication inkblot is generated from an authentication inkblot seed by initializing a pseudo-random number generator with the authentication inkblot seed and then determining the authentication inkblot parameter values as a function of one or more pseudo-random values. Authentication inkblot parameters include number of blots, blot location, blot size, blot color, blot rotation, blot shape, Perlin noise, axes of symmetry, axis of symmetry angle from vertical, and the like. Suitable authentication inkblots typically have several such parameters.

A computer system user associates authentication information with each authentication inkblot. A user's natural language description of the authentication inkblot is able to serve as authentication information, however, by utilizing a user-computable hash of the natural language description as the authentication information instead, the authentication process is made more efficient. By utilizing a user-computable hash of the natural language description that results in a constant number of alphanumeric characters, such as, "take the first and last characters of the description", the authentication process can be made more efficient still, because a low entropy 'enter' character is not required to progress the display of an authentication inkblot series.

A detailed inkblot authentication protocol is disclosed. To establish or change authentication information, a series of authentication inkblots is first shown in a random order and then again in the order that is utilized for authentication. It is verified that the user's response to a particular authentication inkblot is the same regardless of the order in which it is shown. This protocol makes it more likely that a user actually performs the authentication inkblot to authentication information association task, rather than simply ignoring the authentication inkblots. For authentication itself, it is desirable that the user is eventually able to memorize the high entropy authentication information and ignore the authentication inkblots, paying attention to them only when the user requires assistance recalling the authentication information, but when establishing or changing authentication information, it is advantageous to make it difficult for users to opt out of high entropy authentication information generation.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
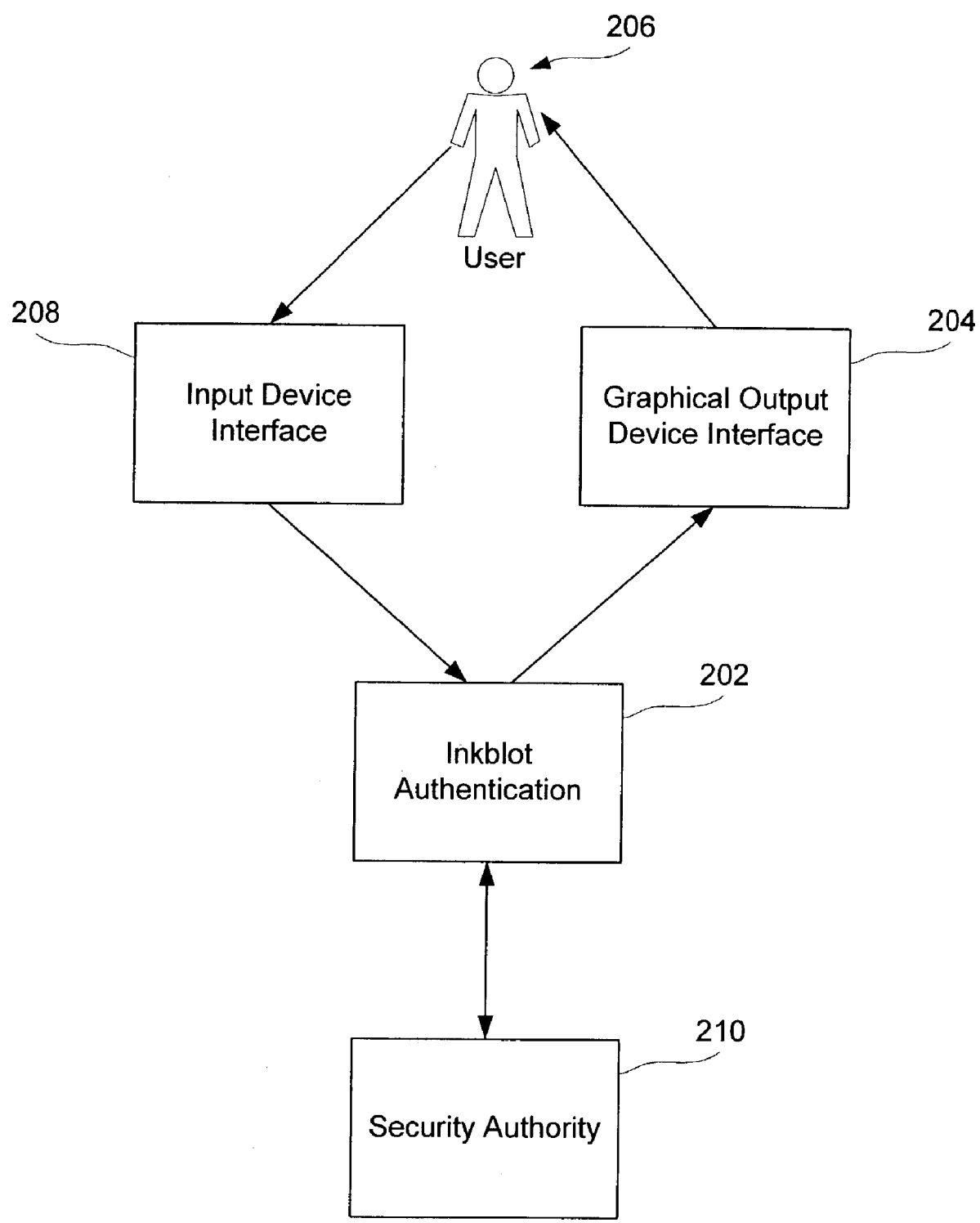
FIG. 2 is a block diagram depicting an example modular software architecture suitable for incorporating aspects of the invention.

FIG. 2 depicts an example modular software architecture suitable for incorporating aspects of the invention. An inkblot authentication module 202 generates authentication inkblots on a graphical output device (e.g., the monitor 191 of FIG. 1) via a graphical output device interface 204, and gathers text input by a user 206 on an input device (e.g., the keyboard 162 or microphone 163 of FIG. 1) via an input device interface 208. In an embodiment of the invention, the user's response to authentication inkblots is vocal and the input device interface 208 utilizes, for example, conventional speech to text techniques to provide the inkblot authentication module 202 with alphanumeric characters. Authentication information gathered by the inkblot authentication module 202 is submitted to a security authority 210 for verification.

In an embodiment of the invention, both the inkblot authentication module 202 and the security authority 210 are local to the input device interface 208 and the graphical output device interface 204. In an alternative embodiment, both the inkblot authentication module 202 and the security authority 210 are remote to the input device interface 208 and the graphical output device interface 204. In another alternative embodiment, the inkblot authentication module 202 is local and the security authority 210 is remote. Other configurations are possible as will be apparent to one of skill in the art.

In an embodiment of the invention, the inkblot authentication module 202 is an extension of a graphical authentication module incorporated into a graphics-capable computer operating system. The Graphical Identification and Authentication (GINA) module, as described in the Authentication section of the February 2003 Microsoft® Windows® Platform Software Development Kit (SDK) documentation in the Microsoft Developer Network (MSDN®) Library, is one example of a graphical authentication module that is capable of being extended to incorporate inkblot authentication module 202 functionality. In an alternative embodiment of the invention, the inkblot authentication module 202 is independent of a pre-existing graphical authentication module.

In an embodiment of the invention, an inkblot authentication protocol, managed by the inkblot authentication module 202, is explicitly initiated by the user 206, for example, with a secure attention sequence (SAS) received via the input device interface 208. In an alternate embodiment, the inkblot authentication protocol is initiated automatically by a security policy enforcement module (not shown) when the unauthenticated user 206 attempts to access computer system resources associated with a security policy requiring authentication (e.g., reading a data file).

Before describing the inkblot authentication protocol in detail, it will be helpful to examine two key aspects of inkblot authentication: the authentication inkblots and their relationship to the authentication information input by the user.

Authentication inkblots are computer-generated inkblot images suitable for knowledge-based user authentication. Authentication inkblots are computer-generated inkblot images with which the user is able to form a semantic association. Authentication inkblots are computer-generated inkblot images for which the user is able to compose a natural language description (e.g., an English language description). In addition, it is desirable that an authentication inkblot have a high entropy association space, that is, that there is a high number of possible semantic associations and/or natural language descriptions for the authentication inkblot. It is further desirable that, in a series of authentication inkblots, as few authentication inkblots as possible have low entropy association spaces. It is desirable that the user is able to form a single, memorable association with each authentication inkblot.

Figure 3:
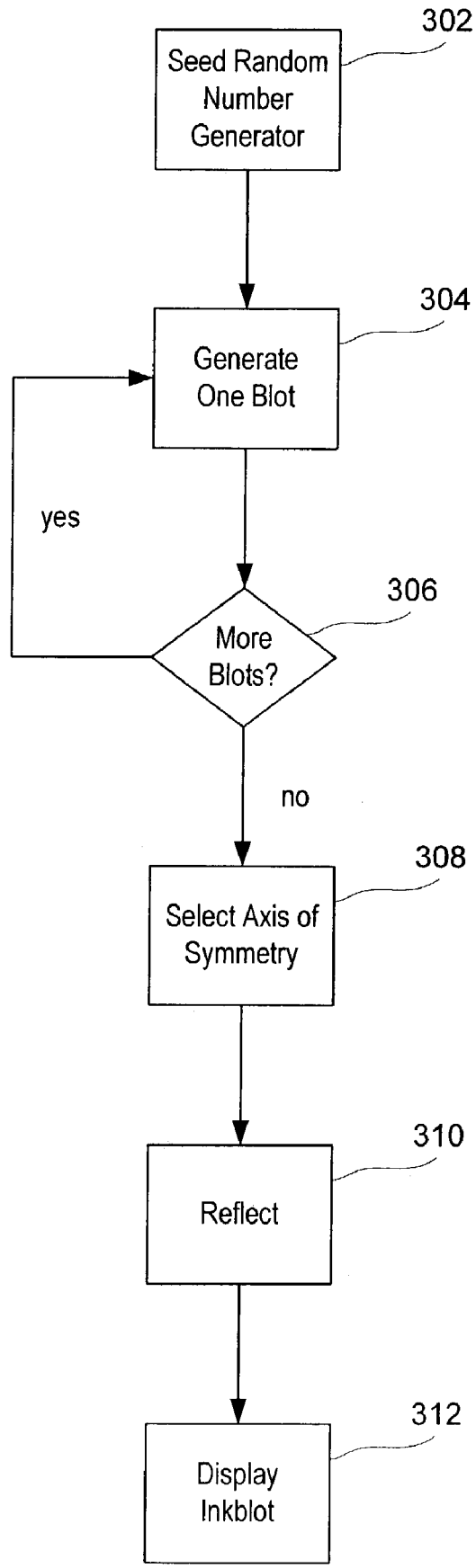
FIG. 3 is a flowchart depicting an example procedure performed by an inkblot authentication module to generate an authentication inkblot in accordance with an embodiment of the invention.

While it is possible to pre-generate and store authentication inkblots, as a practical matter, it is desirable to generate authentication inkblots on demand at the time they are to be presented to the user. In order to generate authentication inkblots on demand, it is desirable that the authentication inkblot generation procedure require only moderate computer processing resource requirements. It is further desirable that the authentication inkblot generation procedure be capable of generating authentication inkblots of visual complexity sufficient to make it a rare occurrence for two different users to see the same authentication inkblot. FIG. 3 depicts an example procedure for generating an authentication inkblot in accordance with an embodiment of the invention.

At step 302, a pseudo-random number generator is initialized with an authentication inkblot seed. Pseudo-random number generators are well known in the art so only some of their features are described here. A pseudo-random number generator generates a series of numbers (e.g., binary numbers) which is, for example, computationally indistinguishable from a truly random series. The pseudo-random number generator is typically "cryptographically strong," but the invention is not so limited. Given the same starting value (the same seed), the same series of pseudo-random numbers is generated. In this example procedure, the pseudo-random number generator initialized with the authentication inkblot seed provides randomness (i.e., entropy) to the distributions of the authentication inkblot parameters determined throughout the procedure. Given the same authentication inkblot seed, the same authentication inkblot parameter values are determined by the procedure, that is, the same authentication inkblot is displayed to the user. It is a typical characteristic of pseudo-random generators that it is possible for even small differences between two seed values to cause large differences in the generated series, so that it is likewise possible for small differences in authentication inkblot seeds to result in authentication inkblots with very different appearances. A random 128-bit unsigned integer is an example of an authentication inkblot seed, however the invention is not so limited.

In the example procedure depicted in FIG. 3, the authentication inkblot (i.e., the authentication inkblot image definition) is generated from one or more component shapes called blots added to an authentication inkblot generation canvas. At step 304, a single blot is added to the canvas. The procedure for generating a single blot is described in detail below with reference to FIG. 6. At step 306, a decision is made as to whether sufficient blots have been added to the canvas. In an embodiment of the invention, a single blot is sufficient. In alternate embodiments, two, three, four and five blots are sufficient. It is possible for any number of blots to be sufficient for the generation of the authentication inkblot. It is desirable to moderate the number of blots generated per inkblot so as to moderate the computer processing resource requirements associated with authentication inkblot generation. If sufficient blots have been added to the canvas, the procedure progresses to step 308, otherwise the procedure returns to step 304 where another blot is added to the canvas.

At step 308, an axis of symmetry is selected for the authentication inkblot. In an embodiment of the invention, each authentication inkblot has one or more axes of symmetry. The portion of the authentication inkblot on one side of each axis of symmetry is the mirror image of the portion of the authentication inkblot on the other side of the axis of symmetry. In an embodiment of the invention, each authentication inkblot has one vertical axis of symmetry passing through the center of the authentication inkblot generation canvas. In an alternative embodiment, each authentication inkblot has one vertical and one horizontal axis of symmetry each passing through the center of the canvas.

Figure 4:
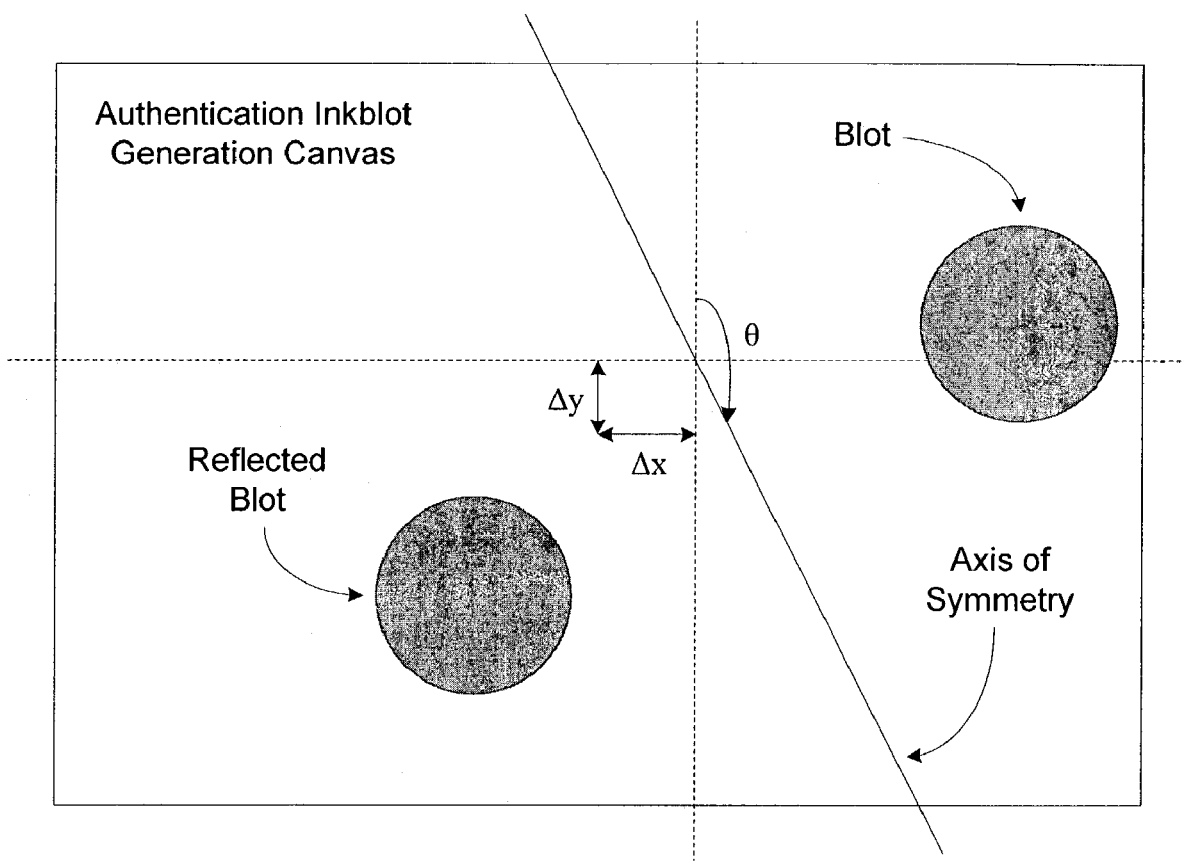
FIG. 4 is a schematic diagram of an authentication inkblot generation canvas with an axis of symmetry.

In another alternative embodiment, illustrated in FIG. 4, each axis of symmetry is at an angle θ to the vertical and passes through a point at an offset (Δx,Δy) from the center of the authentication inkblot generation canvas. In one embodiment of the invention, one fixed, pseudo-randomly determined value for each of the angle θ and the offset (Δx,Δy) is utilized for each authentication inkblot generated. In another embodiment, a different pseudo-randomly determined value for each of the angle θ and the offset (Δx,Δy) is utilized for each authentication inkblot generated. In yet another embodiment, values for each of angle θ and the offset (Δx,Δy) are randomly selected such that values greater than zero are less likely in proportion to the magnitude of the value. Other schemes are possible, as will be apparent to one of skill in the art.

Figure 5:
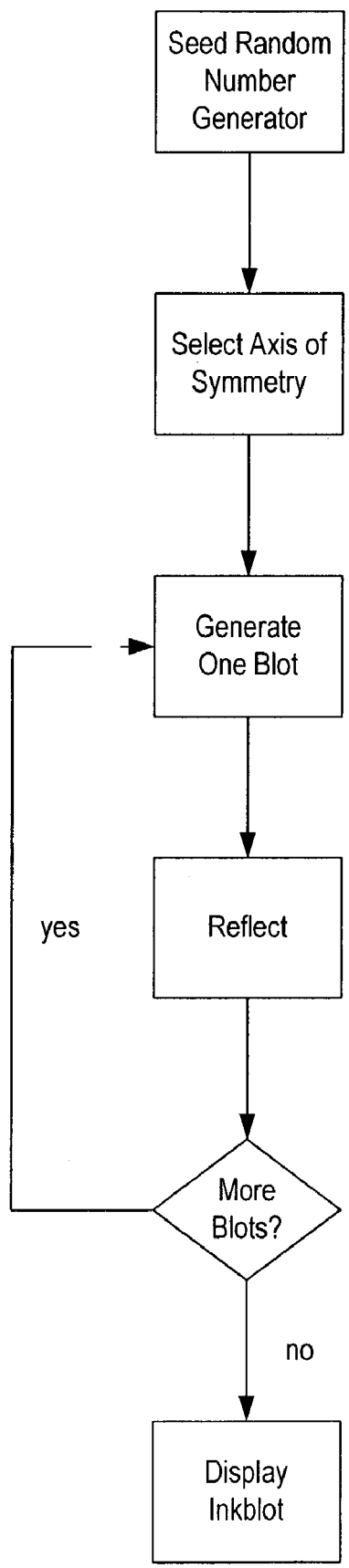
FIG. 5 is a flowchart depicting another example procedure performed by an inkblot authentication module to generate an authentication inkblot in accordance with an embodiment of the invention.

At step 310, the reflection (the mirror image), about the selected axis of symmetry, of the blots so far added to the authentication inkblot generation canvas is generated and also added to the canvas, thus doubling the number of blots and resulting in an authentication inkblot with the desired axis of symmetry. In embodiments including multiple axes of symmetry, this step is repeated for each axis. In an alternative embodiment of the invention, the selection of axes of symmetry occurs before any blots are generated, and reflection about the axes occurs immediately after a blot is added to the canvas. FIG. 5 depicts this alternate embodiment. Additional alternative step orderings are possible, as will be apparent to one of skill in the art.

At step 312, the authentication inkblot now on the generation canvas is displayed on the graphical output device via the graphical output device interface 204 (of FIG. 2). An example of a suitable authentication inkblot generation canvas is a two dimensional array of pixels with a size of 1000 pixels wide and 600 pixels high. In an embodiment of the invention, the authentication inkblot generation canvas is incorporated into the graphical output device interface 204 so that adding blots to the canvas results in their being displayed on the graphical output device. In this case, an explicit display inkblot step 312 is unnecessary.

Figure 6:
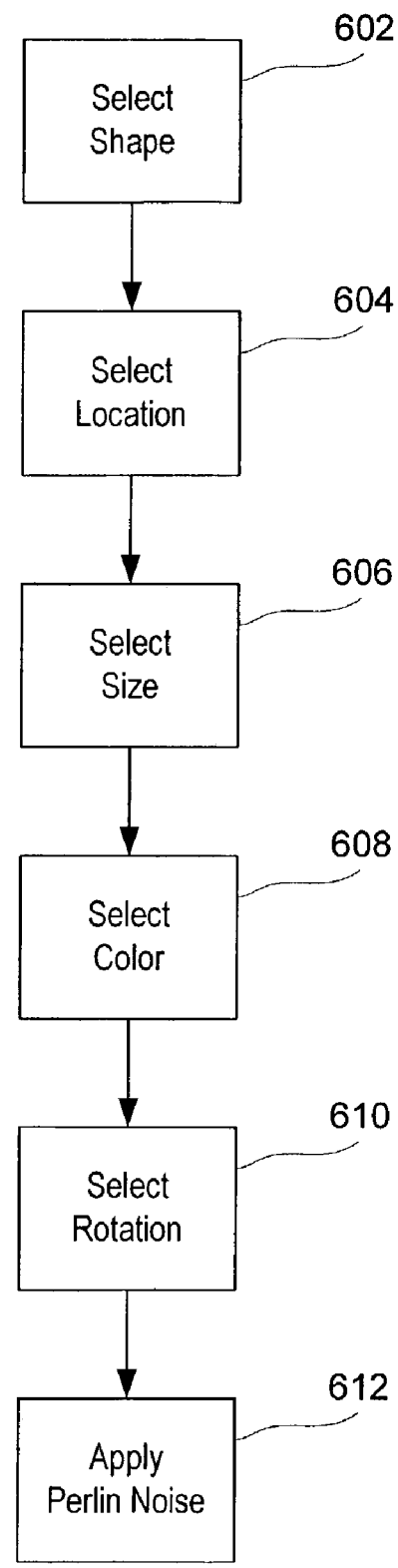
FIG. 6 is a flowchart depicting an example procedure performed by an inkblot authentication module to generate a single blot in accordance with an embodiment of the invention.

FIG. 6 depicts a detailed example procedure for generating one blot in accordance with an embodiment of the invention. In one embodiment of the invention, such a procedure is incorporated into step 304 of FIG. 3. As previously discussed with reference to FIG. 3, in an embodiment of the invention, a pseudo-random number generator is utilized to add randomness to the distribution of authentication inkblot parameters. The pseudo-random number generator initialized with a particular authentication inkblot seed is available to the steps of the example procedure depicted in FIG. 6.

At step 602, the initial blot shape is pseudo-randomly selected from a set of possible shapes. Circles, ovals, triangles, squares, rectangles, pentagons, hexagons, and so on, are suitable shapes for incorporation into an embodiment of the invention, however the invention is not limited to convex shapes. In an embodiment of the invention, each generated blot potentially has a different initial shape, i.e., the initial shape of each blot is pseudo-randomly selected. In an alternative embodiment, each blot associated with a particular user has the same initial shape, however blots generated for different users potentially have a different initial shape. In another alterative embodiment, each blot associated with a particular authenticating computer system has the same initial shape, however blots associated with different authenticating computer systems potentially have a different initial shape. In another embodiment, the initial shape of each generated blot is an oval. Other such shape selection schemes are possible, as will be apparent to one of skill in the art.

At step 604, a pseudo-random location on the authentication inkblot generation canvas is selected for the blot. In an embodiment of the invention, blot locations are distributed uniformly across the canvas. In an alternative embodiment, the blot locations are distributed across only a portion of the canvas, for example, on one side of an axis of symmetry.

At step 606, a size greater than zero is pseudo-randomly selected for the blot. In an embodiment of the invention, blot sizes are distributed uniformly between a maximum blot size and a minimum blot size. In an alternative embodiment, blots sizes toward the center of the blot size range are proportionally more likely to be selected. Some shapes have only one size parameter, for example, circle size is determined by radius alone. Other shapes suitable for incorporation into an embodiment of the invention have more than one size parameter, for example, an oval has a height and a width parameter. Where a shape has more than one size parameter, in an embodiment of the invention, each size parameter is determined independently. In an alternate embodiment, some of the size parameters are set to the same value.

At step 608, a color is pseudo-randomly selected for the blot. In an embodiment of the invention, blot colors are distributed uniformly across a color space defined by the graphical output device interface 204 (of FIG. 2). Examples of suitable color spaces include 32-bit red-green-blue with transparency, 8-bit grayscale and 1-bit single color. In an alternative embodiment, blot colors are pseudo-randomly selected from a relatively small set of distinct colors (e.g., 13 colors). In another alternative embodiment of the invention, some of the blot colors are weighted so as to be more likely to be selected than other colors. In an embodiment of the invention, the color black is weighted so that 50% of selected blot colors are black.

At step 610, an angle through which the blot is to be rotated is pseudo-randomly determined. In an embodiment of the invention, blot rotation angles are distributed uniformly between +180 and −180 degrees.

At step 612, Perlin noise is applied to the blot shape in order to increase the visual complexity of the blot. Perlin noise and means for applying it to graphical shapes is known in the art, so only some of its features are described here. For details, refer to Perlin, K., *An Image Synthesizer*, Computer Graphics 19-3 (1985). Briefly, the perimeter of the blot is perturbed by narrow bandpass noise that is statistically invariant under rotation and translation.

In an alternative embodiment of the invention, simple radial jitter is applied to the perimeter of the blot at step 612. The radial jitter, i.e., a pseudo-random increase or decrease of the distance of the blot perimeter from the center of the blot, is applied at regular locations around the blot perimeter. In an embodiment of the invention, the jitter is uniformly distributed between a maximum perimeter increase and a maximum perimeter decrease. In an embodiment of the invention, the number of perimeter locations where jitter is applied and/or the distance around the perimeter between the jitter application locations is pseudo-randomly determined. In an embodiment of the invention, a fixed total number of jitter application locations, e.g., 2000, is divided among the number of blots to be generated. Other jitter application schemes are possible, as will be apparent to one of skill in the art. In another alternative embodiment, step 612 is omitted where the authentication inkblots being generated without it already have sufficient visual complexity.

In response to the authentication inkblot being displayed on the graphical output device, the user inputs authentication information. In an embodiment of the invention, the authentication information is an alphanumeric text string (e.g., a string of Unicode characters). The authentication inkblot acts first as a prompt to aid the user in generating the authentication information, and then later as an aid to memory, helping the user recall the generated authentication information. In an embodiment of the invention, the alphanumeric text string that the authentication inkblot aids recall of is the user's natural language description (e.g., English language description) of the authentication inkblot. In an embodiment of the invention, the alphanumeric text string input by the user as authentication information is a high entropy hash of the user's natural language description, that is, a user-computable transformation of the user's natural language description that harvests the description's entropy. Natural language descriptions are typically redundant. It isn't necessary for the user to input the entire natural language description in order to benefit from the natural language description's entropy for the purposes of knowledge-based user authentication.

Figure 7:
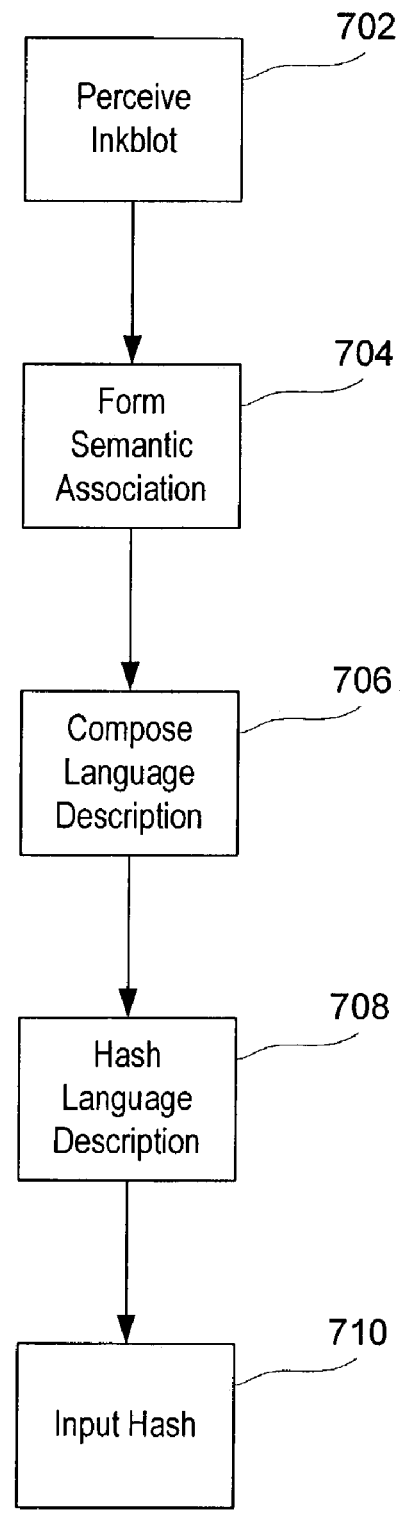
FIG. 7 is a flowchart depicting a procedure to generate a language description hash in accordance with an embodiment of the invention.
Figure 8:
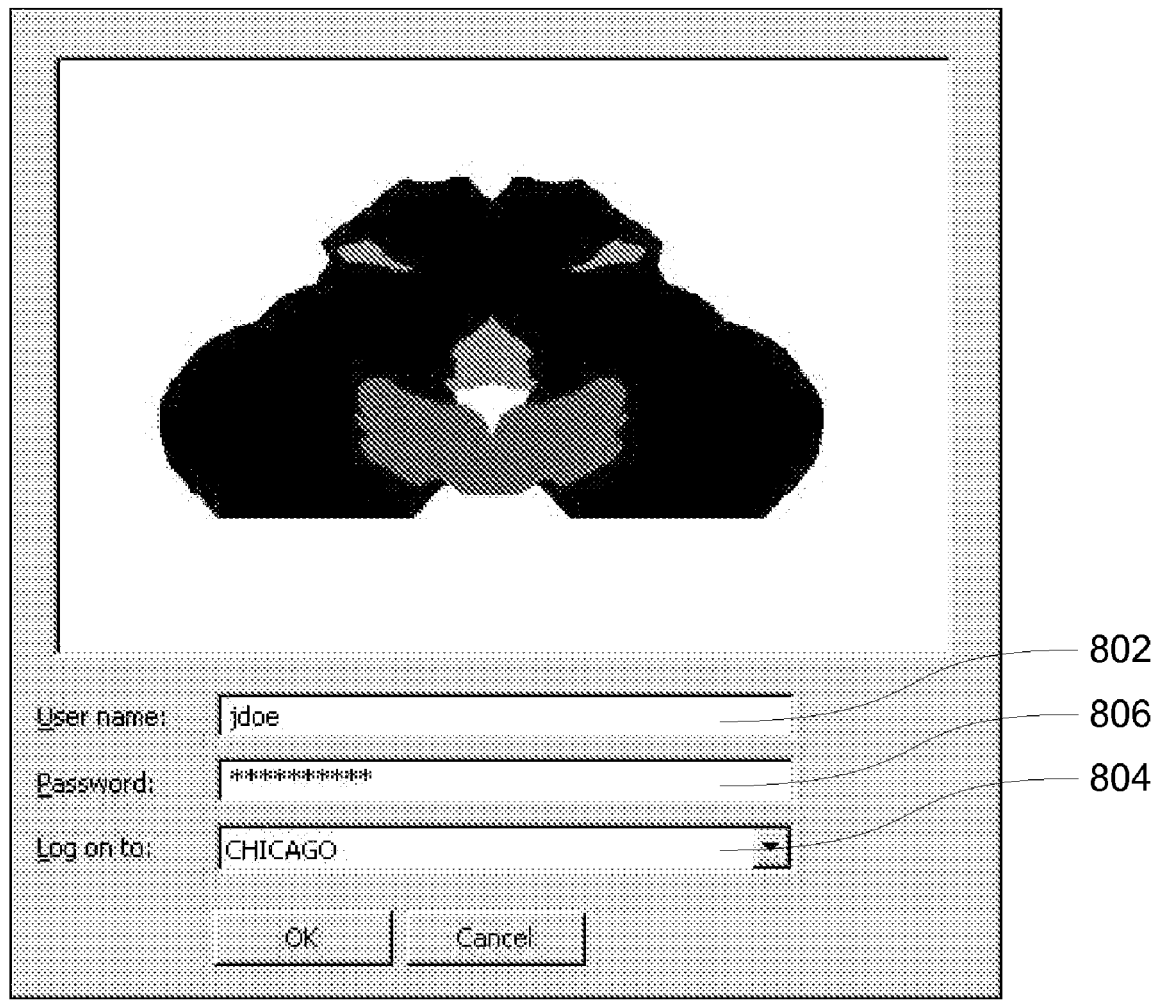
FIG. 8 is an example of a suitable graphical user interface incorporating aspects of the invention.

FIG. 7 depicts a procedure to generate a language description hash in accordance with an embodiment of the invention. At step 702, the user (or an attacker) perceives the authentication inkblot on the graphical output device (e.g., the monitor 191 of FIG. 1). At step 704, the user (or attacker) forms a semantic association with the authentication inkblot. For example, in perceiving the authentication inkblot illustrated in FIG. 8, the user sees two people dancing; the attacker sees a mask. Some authentication inkblots have low entropy association spaces, for example, some authentication inkblots look like a butterfly to the majority of users, but typically, in an embodiment of the invention, many semantic associations are possible for the same authentication inkblot.

At step 706, the user or attacker composes a natural language description for their semantic association. For example, the user describes the authentication inkblot of FIG. 8 as "two people dancing," "2 people dancing," "people dancing," "a dance," or "dancing." In an embodiment of the invention, the user is instructed to select one memorable description and to consistently respond with it for a particular authentication inkblot. This example illustrates the possibility of different natural language descriptions for the same semantic association, which provides for additional entropy.

At step 708, the user performs a hash transform of the natural language description. In an embodiment of the invention, the user is instructed to hash their natural language description of the authentication inkblot, for example, to enter only the first and last characters of their description, so that "two people dancing" becomes "tg," "2 people dancing" becomes "2g," "people dancing" becomes "pg," "a dance" becomes "ae," "dancing" becomes "dg," and "mask" becomes "mk." At step 710, the result of the hash is input utilizing the input device (e.g., the keyboard 162 or microphone 163 of FIG. 1). In a typically less efficient embodiment of the invention, the user does not perform step 708, but simply inputs the natural language description at step 710. In an embodiment of the invention, the input to the input device is vocal and the resulting authentication information need not be identical to that which would be input by, for example, keyboard in the same circumstances. For example, the authentication information may be an encoding of the audio characteristics of the vocal response.

Language description hashes are utilized in order to reduce authentication information input time per authentication inkblot (because the user inputs less characters) as well as to achieve a constant number of characters per authentication inkblot. These both result in a more efficient user authentication, especially as the number of authentication inkblots per authentication increases. In embodiments where the hash function does not result in a constant number of characters, a low entropy 'enter' character is added to the authentication information input in response to each authentication inkblot presented.

In an embodiment of the invention, the user-computable hash function is designed to harvest as much of the natural language description entropy as possible while remaining easy to remember and to perform. Another high entropy example is: enter only the first and second last characters of the description. Yet another high entropy example is: enter only the second and second last characters of the description. Other high entropy user-computable natural language hashes are possible, as will be apparent to one of skill in the art. A lower (on average) entropy example is: enter only the first two characters of the description. Given the first character of a natural language word, the second and subsequent characters are typically more predictable than a character from a different word. An example that does not result in a constant number of characters is: enter only the first character of each word in the description.

Although, in a typical embodiment, each user is instructed to utilize the same natural language description hash, the user is free to utilize a different custom hash as long as it is compatible with the recommended hash, for example, it results in the same number of characters. In addition, once the authentication information has been memorized by the user, for example, through simple repetition, the user is free to skip steps 702, 704, 706, 708, and simply input the memorized authentication information. If the authentication is subsequently forgotten, for example, during a vacation, the user is likewise free to resume the authentication inkblot to authentication information association task.

Figure 9A:
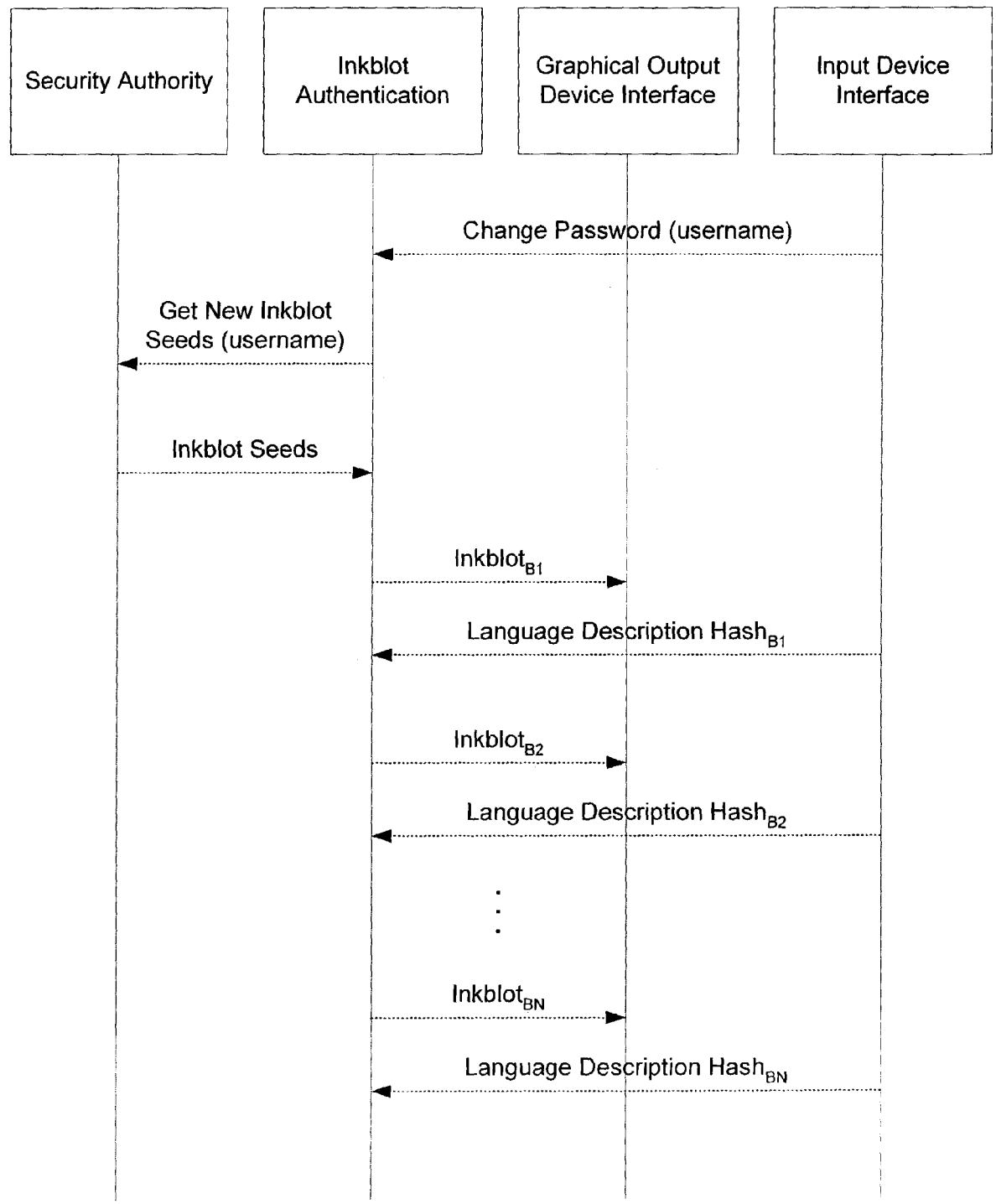
FIG. 9A is a protocol diagram illustrating a first part of an example change authentication information operation of an inkblot authentication protocol in accordance with an embodiment of the invention.
Figure 9B:
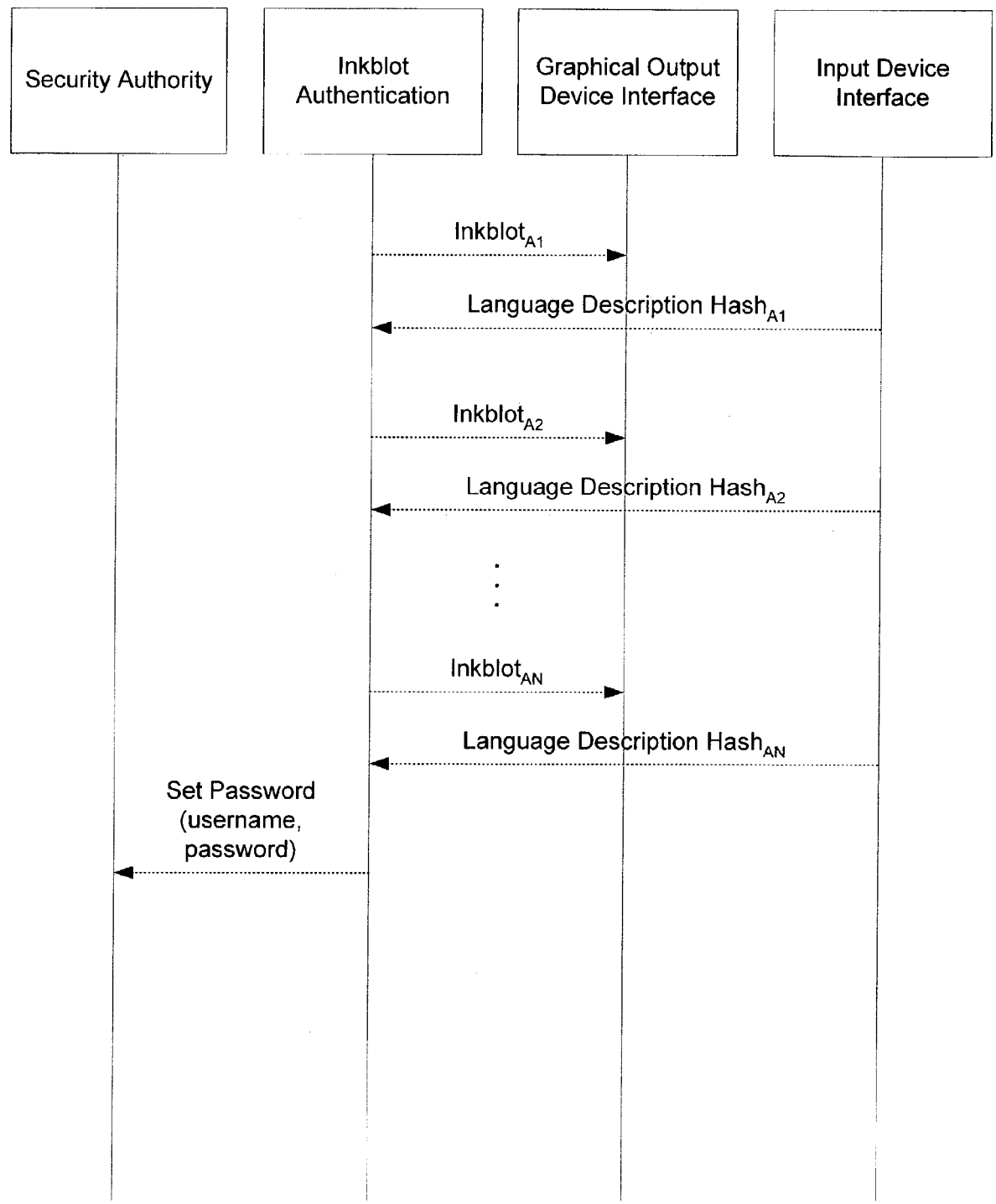
FIG. 9B is a protocol diagram illustrating a second part of the example change authentication information operation of an inkblot authentication protocol in accordance with an embodiment of the invention.

Returning now to the inkblot authentication protocol, in an embodiment of the invention, there are two main protocol operations: change authentication information (e.g., change password), and authenticate (e.g., login). In an embodiment of the invention, the initial creation of authentication information (e.g., create new password) is a special case of the change authentication information operation, in which the user does not first authenticate in order to be able initiate the protocol operation. FIG. 9A and FIG. 9B illustrate a first part and a second part, respectively, of an example change authentication information protocol operation in accordance with an embodiment of the invention. Discussion with reference to FIG. 9A, FIG. 9B and like figures will aid in the understanding of inkblot authentication protocols suitable for incorporation in an embodiment of the invention.

With reference to FIG. 9A, the example change authentication information protocol operation begins with a Change Password message incorporating a username parameter. The Change Password message is sent from the input device interface (i.e., the input device interface 208 of FIG. 2) to the inkblot authentication module (i.e., the inkblot authentication module 202 of FIG. 2). For example, the user (i.e., the user 206 of FIG. 2) activates a user interface element on the input device which results in the Change Password message being sent to the inkblot authentication module.

In an embodiment of the invention, a message is the local invocation of a module operation, for example, the Change Password message is the local invocation of the Change Password operation of the inkblot authentication module. In an alternate embodiment, the message is a data packet from a remote computer system which results in the local invocation of a module operation, for example, a remote computer system sends a Change Password message via a remote procedure call (RPC) that results in the local invocation of the Change Password operation of the inkblot authentication module. In an embodiment of the invention, a parameter is incorporated into the message as part of the message payload, for example, the username parameter is added to the Change Password message by the input device interface. In an alternate embodiment, the parameter is incorporated into the message by a message recipient from a per user context maintained by the message recipient, for example, upon receipt of the Change Password message, the inkblot authentication module adds the username parameter from a per-user context it maintains for messages received from that user.

As a result of receiving the Change Password message, the inkblot authentication module sends a Get New Inkblot Seeds message incorporating the username parameter to the security authority (i.e., the security authority 210 of FIG. 2). A conventional security authority maintains a user identifier and authentication information association (e.g., a username and associated password) for each user. A security authority suitable for incorporation into an embodiment of the invention also maintains (or is capable of being extended to maintain) a user identifier and authentication inkblot seed set (AISS) association for each user.

An authentication inkblot seed set contains one or more authentication inkblot seeds. The number of authentication inkblot seeds in the set is configurable and is chosen to achieve a desired level of authentication information entropy. For example, if the desired authentication information entropy is 60 bits and the natural language description hash is determined (e.g., empirically) to be yielding 6 bits per inkblot (e.g., 3 bits per character, 2 characters per inkblot), authentication inkblot seed set size is chosen to be 10, i.e., 10 character pairs at 3 bits per character yields the desired 60 bits of authentication information entropy. In an embodiment of the invention, the one or more authentication inkblot seeds of the authentication inkblot seed set are consistently generated from a single authentication inkblot seed utilizing a suitable cryptographic hashing algorithm.

In an embodiment of the invention, the security authority maintains an authentication database with one or more records for each user, the one or more records each having fields including username, authentication inkblot seed set, and password. In an embodiment of the invention, each authentication inkblot seed is generated as the result of a value from a pseudo-random number generator being cryptographically hashed with a security authority identifier such as the security authorities' fully qualified domain name (FQDN). In an embodiment of the invention, each authentication inkblot seed is further cryptographically hashed with a user identifier such as the user's username.

In an embodiment of the invention, the security authority maintains a per security authority authentication inkblot seed set. An authentication inkblot seed set unique to a user is obtained by cryptographically hashing the per security authority authentication inkblot seed set with the user's unique username, a last authentication information change timestamp and, optionally, additional suitable information. An advantage of this embodiment is that it makes it more difficult for an attacker to use the security authority as an oracle with regard to whether or not a particular user is registered with the security authority (i.e., a user identifier and authentication information association exists for the user). Rather than responding with "no such user" or the like when queried regarding a particular user not registered with the security authority, the security authority is capable of generating a consistent authentication inkblot seed set, on demand, for any valid username regardless of whether or not the user is registered with the security authority.

In response to the Get New Inkblot Seeds message, the security authority sends the authentication inkblot seed set associated with the user identified by the username parameter to the inkblot authentication module. The authentication inkblot seeds are generated and arrive at the inkblot authentication module in an order A, but in the example change authentication information protocol operation depicted in FIG. 9A and FIG. 9B, the associated authentication inkblots are first (in FIG. 9A) presented in a random different order B, and then again (in FIG. 9B) in order A.

The inkblot authentication module generates an authentication $inkblot_{B1}$ from the first authentication inkblot seed in the randomly determined order B, for example, utilizing the authentication inkblot generation procedure discussed with reference to FIG. 3, and then outputs the authentication $inkblot_{B1}$ to the graphical output device (i.e., via the output device interface 204 of FIG. 2) where it is perceived by the user. In response, the user performs the authentication inkblot to natural language description association task described with reference to FIG. 7 and inputs a $hash_{B1}$ of the natural language description via the input device. The inkblot authentication module records the natural language description $hash_{B1}$ and its association with authentication $inkblot_{B1}$ and then proceeds to the second authentication inkblot seed in the randomly determined order B. The process is repeated until each of the authentication inkblots have been displayed in order B and the inkblot authentication module has recorded the authentication information input in response to each.

The example change authentication information protocol operation continues in FIG. 9B. Having displayed each of the authentication inkblots in order B, the same authentication inkblots are now displayed again, this time in the original order A. This is also the presentation order A that will subsequently be used for authentication (see the discussion below with reference to FIG. 10). The inkblot authentication module generates an authentication $inkblot_{A1}$ (e.g., the authentication inkblot illustrated in FIG. 8) from the first authentication inkblot seed in the order A and outputs it to the graphical output device where it is once again perceived by the user. In response, the user either directly recalls the authentication information (i.e., natural language description $hash_{A1}$, e.g., "tg") previously input in response to the authentication $inkblot_{A1}$, or once again performs the natural language description association task (e.g., "two people dancing"), computes the description $hash_{A1}$ (e.g., first and last characters of the description) and inputs it.

It is possible for authentication $inkblot_{A1}$ to correspond to any of the authentication inkblots previously displayed in random order B (i.e., $inkblot_{B1}$ through $inkblot_{BN}$), for example, authentication $inkblot_{A1}$ in order A is authentication $inkblot_{B2}$ in random order B. The inkblot authentication module verifies that the authentication information input in response to authentication $inkblot_{A1}$ is the same as was input in response to authentication $inkblot_{B2}$. If it is the same, the inkblot authentication module proceeds to the second authentication inkblot seed in the original order A. The process is repeated until each of the authentication inkblots have been displayed in order A, and the inkblot authentication module has verified that the authentication information input in response to each authentication inkblot is the same as was previously input when the authentication inkblots were displayed in the random order B.

Presenting each authentication inkblot twice during the change authentication information protocol allows for simple confirmation of the authentication information, for example, to reduce errors due to mistyping. Presenting the set of authentication inkblots first in a different order to the order in which they will typically be presented, ensures that the user actually performs the authentication inkblot to natural language description hash association task rather than subverting the process with a low entropy choice, for example, ignoring the authentication inkblots and simply selecting a dictionary word as usual. It is desirable for the user to later dispense with the authentication inkblots as an aid to recalling the authentication information if they are no longer needed by the user, but it is not desirable for the user to ignore the authentication inkblots when initially generating authentication information. In an embodiment of the invention, the inkblot authentication module includes further measures to reduce the likelihood that the user inputs low entropy authentication information, for example, detecting the input of the same character or character sequence in response to each authentication inkblot.

Once the inkblot authentication module has verified that the user has twice input the same authentication information for the each authentication inkblot in the authentication set, in an embodiment of the invention, the alphanumeric characters input in response to each authentication inkblot are concatenated in order A. In an embodiment of the invention, the concatenated authentication inkblot natural language description hashes are able to serve as a conventional password. In the example change authentication information protocol operation depicted in FIG. 9B, the password for a particular user is changed by sending a conventional Set Password message incorporating the username parameter that identifies the particular user, and a password parameter that is the concatenated authentication inkblot natural language description hashes.

In an embodiment of the invention, the change authentication information protocol operation incorporates a mechanism to enable the user, during the initial presentation of the authentication inkblots in the order B, to skip an authentication inkblot for which the user is unable to form a semantic association, that is, to request that the associated authentication inkblot seed be excluded from the set of authentication inkblot seeds utilized when generating authentication inkblots to authenticate the user. For example, the graphical user interface shown in FIG. 8 has, in addition, a Skip button (not shown in FIG. 8), the inkblot authentication module initially receives more authentication inkblot seeds than required to meet authentication information entropy goals (e.g., one additional authentication inkblot seed), and/or the inkblot authentication module is capable of requesting one or more additional authentication inkblots seeds from the security authority (e.g., via a Get More New Inkblot Seeds message). In addition, there is a protocol message Set AISS Order incorporating a username parameter identifying the user with which to associate the authentication inkblot seed set (AISS), and the set of authentication inkblot seeds corresponding to the authentication inkblots for which the user was able to form a semantic association in the order A. Alternatively, the Set Password protocol operation is modified to include the AISS parameter. Other such mechanisms are possible as will be apparent to one of skill in the art.

Figure 10:
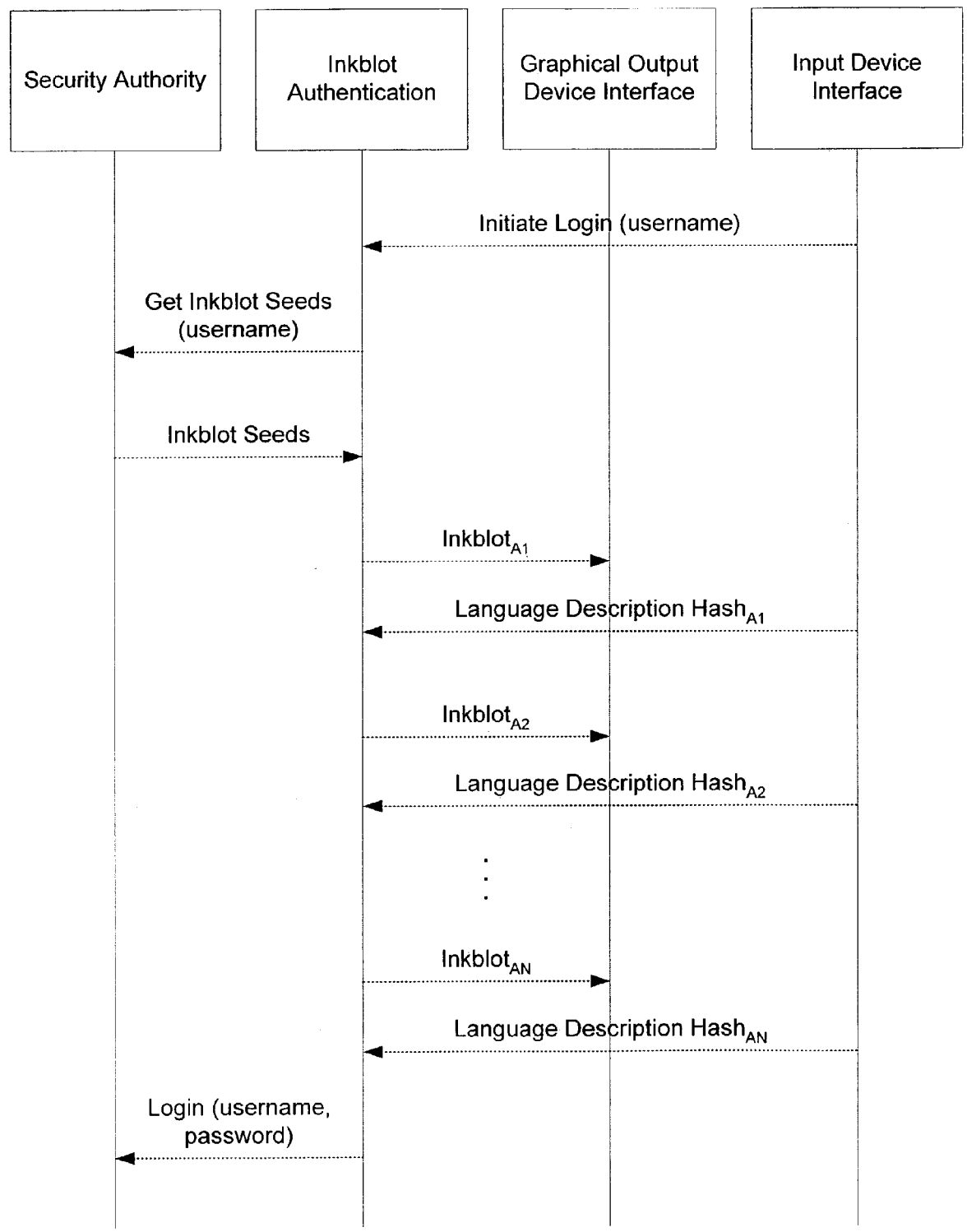
FIG. 10 is a protocol diagram illustrating an example authentication operation of an inkblot authentication protocol in accordance with an embodiment of the invention.

Authentication information is created and/or changed at the security authority in order that the user is later able to authenticate utilizing that authentication information. Of course, authentication information need not be stored as plaintext at the security authority. In an embodiment of the invention, the security authority is able to take advantage of the full range of conventional authentication information protection mechanisms such as storing the authentication information as a cryptographic hash of the plaintext. FIG. 10 illustrates an example authentication operation of an inkblot authentication protocol in accordance with an embodiment of the invention. In this example, the authentication information was previously set at the security authority utilizing the change authentication information protocol operation depicted in FIG. 9A and FIG. 9B.

The example authentication begins with an initiate inkblot authentication message (i.e., Initiate Login in this example) incorporating a username parameter that identifies the user to be authenticated. The Initiate Login message is sent from the input device interface to the inkblot authentication module. For example, the user utilizes the graphical user interface of FIG. 8 as part of the authentication process. The user enters their username in a text entry field 802. The username uniquely identifies the user within an authentication domain, selected from a selection list 804. The specification of an authentication domain is optional. There is a de facto default authentication domain, i.e., the domain of users served by the security authority. As the user enters the password text entry field 806, the Initiate Login message is sent to the inkblot authentication module. Other graphical and non-graphical user interfaces are suitable for incorporation in an embodiment of the invention, as will be apparent to one of skill in the art.

As a result of receiving the Initiate Login message, the inkblot authentication module sends a Get Inkblot Seeds message incorporating the username parameter to the security authority. In response, the security authority returns the authentication inkblot seed set previously associated with the username. If the user with the specified username is not registered with the security authority then, in an embodiment of the invention, the security authority generates and returns an authentication inkblot seed set for the username such that the generated authentication inkblot seed set is different from, but also statistically indistinguishable from, an authentication inkblot seed set associated with a registered user. An unregistered user is not able to authenticate. This measure is taken to make it more difficult for an attacker to determine if a particular user is registered with a particular security authority.

In an embodiment of the invention, a further measure is taken to make it more difficult for an attacker attempting to determine if a particular username corresponds to a registered or unregistered user by observing how the authentication inkblot seed set associated with the username changes over time, for example, with respect to a corporate password change policy. To make sure that authentication inkblot seed sets generated for unregistered usernames change with the same regularity and randomness as for the seed sets associated with registered users, the security authority periodically (e.g., in accord with the corporate password change policy) changes its per security authority authentication inkblot seed set and retains the previous seed set. The unique authentication inkblot seed set generated for an unregistered user is based on one of the two seed sets (i.e., this period or last period) and the seed set to be utilized is chosen based on a secret function of the username.

The inkblot authentication module generates an authentication inkblot for each authentication inkblot seed in the authentication inkblot seed set. The authentication inkblots are displayed to the user on the graphical output device in the order A in which they were presented during authentication information change/creation. In response to each authentication inkblot, the user inputs a hash transformation of the natural language description that the user associates with the authentication inkblot. The natural language description hash is the same hash utilized by the user during authentication information change/creation.

Once the user has responded to each authentication inkblot, the responses are concatenated to obtain the authentication information (i.e., the password in this example). If the user has memorized the authentication information, it is possible for the user to enter the authentication information without performing the natural language description association and description hash tasks. In the example authentication operation of the inkblot authentication protocol depicted in FIG. 10, a conventional Login message incorporating the username parameter identifying the user to be authenticated, and a password parameter that is the authentication information obtained as described above, is sent to the security authority to verify the authentication information. Not shown in FIG. 10 is the security authorities' response indicating that the user's identity has or has not been authenticated.

In an embodiment of the invention, the user's identity is authenticated if the authentication information precisely matches the authentication information on record at the security authority (i.e., the authentication information match ratio is 100%). In an alternative embodiment of the invention, the user's identity is authenticated if the user responded with the correct natural language description hash to some proportion of the authentication inkblots, for example, the user responded correctly 10 out of 11 times. That is, the user is authenticated if the authentication information match ratio is less than 100% but greater than a configured minimum. Allowing imprecise matching lowers the entropy of the authentication information associated with a given number of authentication inkblots, but it is helpful in reducing improper authentication failures (i.e., failure to authenticate by the true user), particularly when the period between authentications is relatively long (e.g., weeks). Reducing the number of improper authentication failures further increases authentication efficiency and makes it less likely that the user will try to subvert the authentication process, for example, by writing down the authentication information.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method, comprising:
   initializing a pseudo-random number generator with an authentication inkblot seed;
   drawing one or more blots on an authentication inkblot generation canvas to generate an image resembling an inkblot and determining each blot parameter value as a function of one or more pseudo-random values generated by the pseudo-random number generator initialized with the authentication inkblot seed;
   displaying the authentication inkblot generation canvas on a graphical output device;
   receiving one or more alphanumeric characters from an input device in response to each displayed authentication inkblot;
   sending the one or more alphanumeric characters received in response to each displayed authentication inkblot to a security authority as authentication information; and
   authenticating a user based on a match between the displayed inkblot and the alphanumeric characters.

2. The method according to claim 1, wherein the number of blots drawn on the authentication inkblot generation canvas is a function of one or more pseudo-random values generated by the pseudo-random number generator initialized with the authentication inkblot seed.

3. The method according to claim 1, wherein each blot is characterized by a set of blot parameters comprising:
   a blot location;
   a blot size;
   a blot color; and
   a blot rotation.

4. The method according to claim 3, wherein the set of blot parameters further comprise a Perlin noise blot shape perturbation.

5. The method according to claim 3, wherein the set of blot parameters further comprise:
   a number of jitter application points around the blot perimeter; and
   a radial blot perimeter jitter at each of the jitter application points.

6. The method according to claim 1, further comprising reflecting the one or more blots on the authentication inkblot generation canvas about one or more axes of symmetry.

7. The method according to claim 6, wherein the number of axes of symmetry is a function of one or more pseudo-random values generated by the pseudo-random number generator initialized with the authentication inkblot seed.

8. The method according to claim 6, wherein each axis of symmetry passes through a point offset from the center of the authentication inkblot generation canvas, and the offset is a function of one or more pseudo-random values generated by the pseudo-random number generator initialized with the authentication inkblot seed.

9. The method according to claim 6, wherein each axis of symmetry is at an angle to the vertical, and the angle is a function of one or more pseudo-random values generated by the pseudo-random number generator initialized with the authentication inkblot seed.

10. The method according to claim 1, further comprising, prior to the initializing the pseudo-random number generator with the authentication inkblot seed:
- randomly generating the authentication inkblot seed for a computer system user identifier at a computer system serving as a security authority independent of whether a computer system user associated with the computer system user identifier is registered with the security authority;
- cryptographically hashing the authentication inkblot seed with an identifier for the computer system serving as the security authority;
- further cryptographically hashing the authentication inkblot seed with the computer system user identifier; and
- still further cryptographically hashing the authentication inkblot seed with a last authentication information change timestamp for the computer system user if one exists.

11. The method according to claim 1, further comprising:
- receiving audio data from an input device in response to each displayed authentication inkblot;
- biometrically encoding the audio data; and
- sending the encoded audio data to a security authority as authentication information.

12. The method according to claim 1, further comprising:
- receiving one or more alphanumeric characters from an input device in response to each displayed authentication inkblot; and
- sending the one or more alphanumeric characters received in response to each displayed authentication inkblot to a security authority as authentication information.

13. The method according to claim 12, wherein the one or more alphanumeric character received in response to each displayed authentication inkblot is a natural language description of the displayed authentication inkblot.

14. The method according to claim 12, wherein the one or more alphanumeric character received in response to each displayed authentication inkblot is a user-computable hash of a natural language description of the displayed authentication inkblot.

15. The method according to claim 14, wherein the user-computable hash of the natural language description of the displayed authentication inkblot results in a constant number of alphanumeric characters independent of the length of the natural language description.

16. The method according to claim 14, wherein the user-computable hash of the natural language description of the displayed authentication inkblot comprises the first and last characters of the natural language description.

17. A computer-readable medium having thereon computer executable instructions for performing a method comprising:
- initializing a pseudo-random number generator with an authentication inkblot seed;
- drawing one or more blots on an authentication inkblot generation canvas, each blot based on a convex shape and defined by a set of blot parameters, and determining each blot parameter value as a function of one or more pseudo-random values generated by the pseudo-random number generator initialized with the authentication inkblot seed;
- displaying the authentication inkblot generation canvas on a graphical output device,
- receiving one or more alphanumeric characters from an input device in response to each displayed authentication inkblot;
- sending the one or more alphanumeric characters received in response to each displayed authentication inkblot to a security authority as authentication information; and
- authenticating a user based on a match between the displayed inkblot and the alphanumeric characters.

* * * * *